R. R. WILEY.
METHOD OF AND MEANS FOR THE PRODUCTION OF GLASS SIGN CHARACTERS.
APPLICATION FILED JUNE 22, 1917.
1,248,582.
Patented Dec. 4, 1917.
2 SHEETS—SHEET 1.
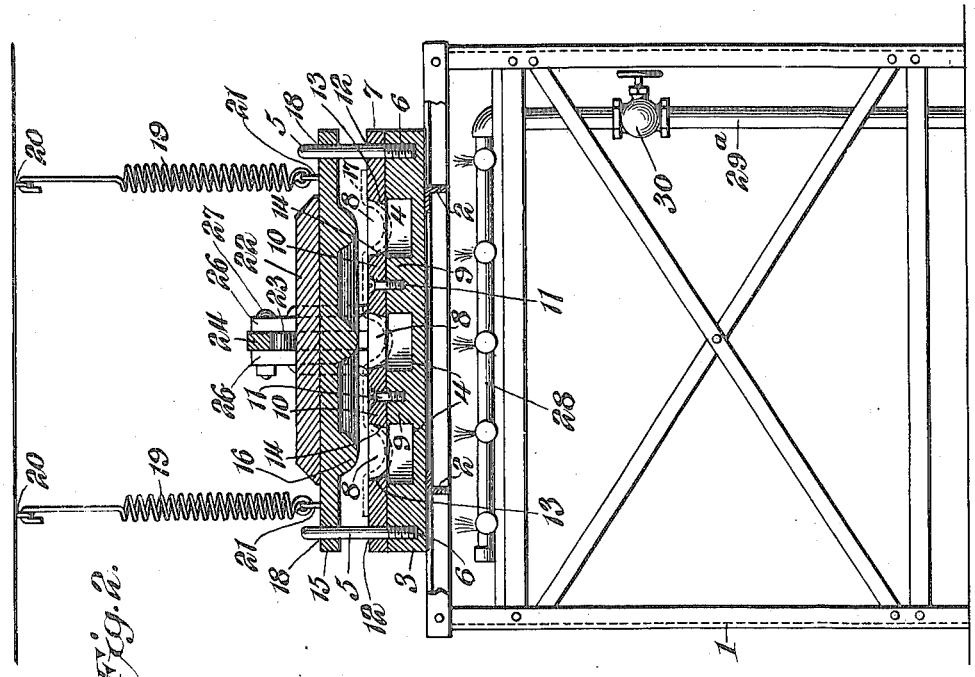
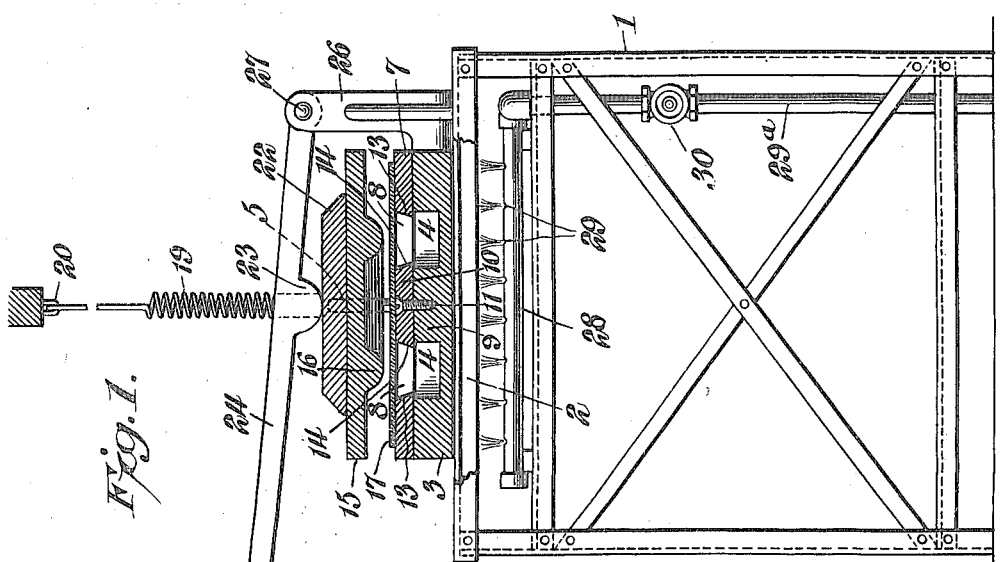
WITNESSES
Howard D. Orr.
F. J. Chapman
Roy R. Wiley, INVENTOR,
BY
ATTORNEY R. R. WILEY.
METHOD OF AND MEANS FOR THE PRODUCTION OF GLASS SIGN CHARACTERS.
APPLICATION FILED JUNE 22, 1917.
1,248,582.
Patented Dec. 4, 1917.
2 SHEETS—SHEET 2.
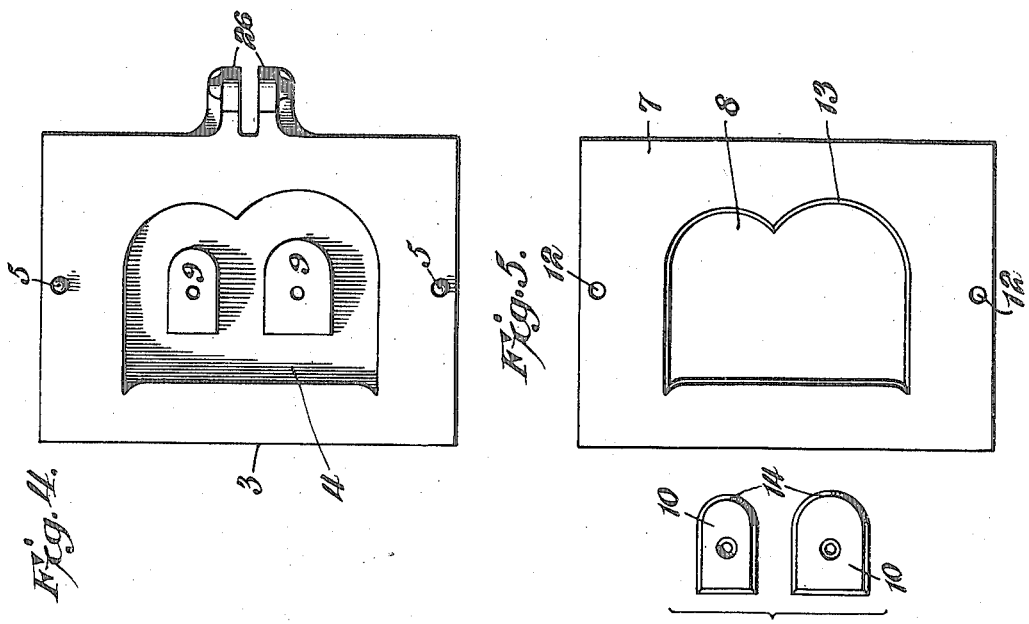
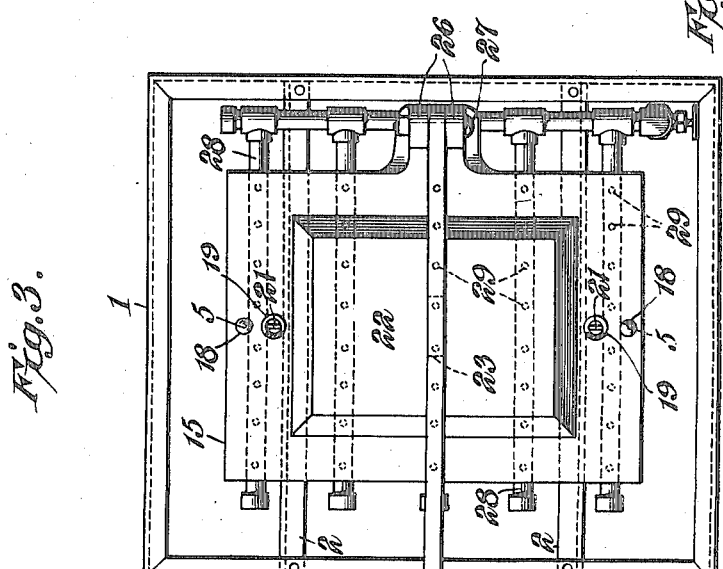
WITNESSES
Howard D. Orr.
F. T. Chapman.
Roy R. Wiley, INVENTOR,
BY E. G. Siggers
ATTORNEY

UNITED STATES PATENT OFFICE.

ROY RODNEY WILEY, OF BUFFALO, NEW YORK.

METHOD OF AND MEANS FOR THE PRODUCTION OF GLASS SIGN CHARACTERS.

1,248,582.

Specification of Letters Patent.

Patented Dec. 4, 1917.

Application filed June 22, 1917. Serial No. 176,373.

*To all whom it may concern:*

Be it known that I, ROY R. WILEY, a citizen of the United States, residing at Buffalo, in the county of Erie and State of New York, have invented a new and useful Method of and Means for the Production of Glass Sign Characters, of which the following is a specification.

This invention has reference to a method of and means for the production of glass sign characters, and its object is to provide sign characters in hollow relief from sheets of glass without injury to the outer surface of the character strokes.

In accordance with the present invention a heated and softened glass sheet is subjected to mechanical pressure applied to what may be considered as the rear surface of the glass sheet to force the sheet into molds of the characters, with the portions of the characters corresponding to the character strokes effectively bottomless so far as the character strokes themselves are concerned. This is accomplished by providing a female die with the portions corresponding to the character strokes so deep that they are effectively bottomless, or they may be actually bottomless, although deep recesses constituting the stroke-forming portions are usually to be preferred. The male member of the device is so arranged that it may act with the female member of the device to form a glass sheet softened by heat with the character strokes in hollow relief.

It is to be understood that the term sign character is intended to cover alphabetical letters, numbers, conventional and fanciful forms, medallions, or any other forms which can be produced out of glass sheets in hollow relief by the means and in accordance with the method of the present invention.

The invention will be best understood from the consideration of the following detailed description, taken in connection with the accompanying drawings forming part of this specification, with the further understanding that while the drawings show a practical form of the invention the latter is not confined to any strict conformity with the showing of the drawings, but may be changed and modified so long as such changes and modifications come within the scope of the appended claims.

In the drawings:—

Figure 1 is a view partly in side elevation and partly in vertical section of a structure for forming relief glass articles in accordance with the present invention.

Fig. 2 is a cross-section of the structure of Fig. 1 in a plane substantially perpendicular to the showing of Fig. 1, but illustrating the supporting table in most part in front elevation.

Fig. 3 is a plan view of the structure of Figs. 1 and 2 with the retracting springs in cross-section.

Fig. 4 is a plan view of the base member of the female die.

Fig. 5 is a plan view of a plate constituting part of the female die.

Fig. 6 is a plan view of parts associated with the structure of Fig. 5 to complete the female die of the particular sign character illustrated in Figs. 4 and 5.

Referring to the drawings there is shown a frame 1 constituting a support, this frame having a top which may be formed of angle strips 2 designed to receive and uphold a block 3 constituting the basic portion of the female die. The block 3 is formed with depressions 4 corresponding to the strokes of a sign character or other article. From opposite sides of the block 3 near the margins thereof rise posts or pins 5 which may have screw-threaded extremities 6 entering the block 3. Applied to the block 3 is a plate 7 having a passage or passages therethrough corresponding to the outlines of the depressions 4 in the block 3, the passage or passages being indicated at 8.

Certain sign characters, and especially letters of the alphabet or numbers, have the strokes so arranged that they may be entirely cut through a plate without omitting any part of the character. For instance, the letter S or the letter E or similar letters with no completely closed loops may have the character strokes complete without the necessity of wholly removing any parts of the plate except those defining the strokes. If the letters happen to be closed letters, like the letter B or the letter D or the letter O, only the outlines can be produced in the plate 7 and the interior portions must be wholly removed. In the drawings such a character has been chosen in order to show how the interior parts are supported.

The groove 4 formed in the basic member 3 of the female die defines the complete character. In the case of the plate 7, however, those parts of the character entirely inclosed the loops must be entirely cut out so that where remains only the marginal outline of the character in the plate 7. Those portions of the character inclosed by the loops and indicated at 9 are readily produced in the basic plate 3 by bosses rising from the bottom of the cut-out part of the block 3. To complete the character, therefore, in the part surrounded by the plate 7, fillers 10 are provided, and these fillers are attached to the elevations or bosses 9 by screws 11 or in any other suitable manner. The fillers 10 are of sufficient thickness to bring them level with the top surface of an applied plate 7, which latter is provided with holes 12 for the passage of the pins 5 serving as guide pins and accurately positioning the plate on the basic portion of the die.

The margins of the opening 8 through the plate 7 are beveled, so that the opening flares toward what constitutes the upper face of the plate in the installed position. This flare is indicated in the drawings at 13. The fillers 10 have beveled edges 14 corresponding to the edges 13, so that the strokes of the character as outlined in the plate 7 slightly taper toward the depressions 4 to which they conform. These character strokes are, therefore, of less area where overlying the depressions 4 than in the face of the plate 7 remote therefrom.

There is also provided a male die in the form of a plate 15 with relief character strokes 16 conforming to the character strokes of the female die, but of sufficiently smaller area to permit the interposition of a glass plate 17 between the walls of the plate 7 defining the character strokes and the rib or relief portion 16 defining the character stroke of the male die. The male die is formed with passages 18 adapted to receive the pins 5, thus accurately guiding the strokes of the male die into the female die. In order to normally maintain the male die in an elevated position, springs 19 are provided having supports 20 from which they may hang and engaging eyes 21 or other means on the male die. There is also provided on the male die a plate 22 engaged by a boss 23 of a lever 24 provided at one end with a handhold 25 and at the other end entering between ears 26 rising from an appropriate part of the basic die block 3, the lever being connected to the ears 26 by a pivot pin 27 or in any other appropriate manner.

Beneath the angle iron supports 2 is a series of pipes 28 provided with openings 29 from which fuel may issue and burn closely beneath the block 3 and in distributed relation thereto. A supply pipe 29ª may be provided to conduct the fuel, preferably gas, to the pipes 28, and this pipe 29ª includes a controlling valve 30.

Ordinarily the die 15 is raised by the springs 19 and suspended at a suitable height. The glass sheet 17 previously heated to a condition of softness, but not sufficient to spontaneously flow, is laid upon the die plate 7, and then by means of the lever 24 the die 15 is depressed, being guided by the pins 5, until the rib 16 engages the softened glass sheet 17 and forces it into the passages 8 in the receiving member of the female die and outlining the character strokes. The result is that the softened glass is forced into hollow relief in conformity with the character strokes, but since there is no bottoming contact in the female die, the outer or what ultimately constitutes the visible surfaces of the character strokes, are not in any manner marred, as may occur when the glass is forced into actual contact with those portions of the female die constituting the bottoms of the depressions in which the relief character strokes are formed. The beveled edges of the plate 7 hold the glass away from side engagement with the female die to a great extent, while the deeper portions of the hollow strokes are simply suspended in spaced relation to the bottom of the depressions 4, so that to all intents and purposes the female die is bottomless and harm to the glass surface by contact with anything while the glass surface is softened by heat is prevented.

The strokes of the character are formed by one movement of the lever 24, and as soon as the glass is pressed into shape the lever 24 may be released, whereupon the springs 19 raise the male die out of contact with the glass.

The whole structure is light and readily operated permitting the formation of the letters with great rapidity.

Since the characters are produced in hot, soft glass, it is advisable and practically necessary to maintain the female die at a sufficiently high temperature to prevent chilling of or damage to the glass sheet, and it is for this reason that the fuel pipes 28 are provided. The angle iron supports 2 provide a convenient means for supporting the female die and permitting the flames to come in direct contact therewith.

What is claimed is:—

1. The method of forming sign characters in hollow relief on glass sheets, which consists in softening the glass sheet to a workable degree which softening is less than that causing spontaneous flow of glass and then applying pressure to one face of the sheet simultaneously over substantially the whole area in which the character strokes are to be formed, with the opposite face of the sheet unsupported either during or after the completion of the production of the hollow relief strokes.

2. The method of producing sign characters in hollow relief on glass sheets, consisting in heating the sheet to a workable condition of softness less than that causing spontaneous flow of the glass, supporting the sheet upon a female die with effectively bottomless portions corresponding to the character strokes to be formed, and then applying pressure to the softened glass sheet over substantially the whole of the unsupported area simultaneously to force the glass sheet into hollow relief character strokes in suspension.

3. Means for the production of hollow relief character strokes in glass sheets, comprising a mold having depressed portions corresponding to the character strokes and of a depth to make them effectively bottomless with respect to the glass sheets, and a die associated with the mold and having relief portions corresponding to the character strokes and positioned to enter the depressed portions of the mold to a depth sufficiently less than the depth of the depressions therein to accommodate the thickness of the glass and avoid the bottoming of the formed character strokes in the depressions in the first-named die.

4. A die structure for the formation of character strokes in hollow relief in glass plates, comprising a female die composed of a basic member and a plate applied thereto, with said plate having a cut through portion of an area as great as the marginal outline of the character, and the basic member having a depressed part larger than the cut-out part of the plate where the plate and basic portion come together, and a male die matching the female die.

5. An apparatus for the formation of sign characters in hollow relief on glass plates, comprising a suitable support with heating means associated therewith, a female die upheld by the support and comprising a basic member with depressions therein, and a facing member with a cut-out area corresponding to the area defined by the character stroke and applied to the basic member, and a male die matching the female die.

6. An apparatus for the formation of sign characters in hollow relief on glass plates, comprising a suitable support with heating means associated therewith, a female die upheld by the support and comprising a basic member with depressions therein, and a facing member with a cut-out area corresponding to the area defined by the character strokes and applied to the basic member, and a male die matching the female die, the male die having means for elastically suspending it above the female die with means for manipulating the male die, and means for guiding it into accurate conformity with the female die.

7. A die structure for the formation of character strokes in relief in glass plates, comprising a female die composed of a basic member with character stroke depressions therein and a facing member in the form of a plate with passages therethrough having beveled edges and conforming to the basic plate where provided with depressions with the tapering portion of the beveled edges toward the basic plate, and a male die matching the surfacing plate of the female die, whereby the portions of a heated and softened glass plate overlying the cut-out beveled portions of the surfacing plate may be pressed by the male die into hollow relief in suspension in the female die without bottoming therein.

In testimony, that I claim the foregoing as my own, I have hereto affixed my signature in the presence of two witnesses.

ROY RODNEY WILEY.

Witnesses:
AUGUSTUS R. WHITE,
GEORGE E. REYNOLDS.